US010029750B2

(12) United States Patent
Fry

(10) Patent No.: US 10,029,750 B2
(45) Date of Patent: Jul. 24, 2018

(54) STABILIZING STRUCTURE FOR A TRAILER

(71) Applicant: Thomas H. Fry, Sun Valley, CA (US)

(72) Inventor: Thomas H. Fry, Sun Valley, CA (US)

( * ) Notice: Subject to any disclaimer, the term of this patent is extended or adjusted under 35 U.S.C. 154(b) by 48 days.

(21) Appl. No.: 15/221,561

(22) Filed: Jul. 27, 2016

(65) Prior Publication Data

US 2018/0029655 A1   Feb. 1, 2018

(51) Int. Cl.
*B62D 63/08* (2006.01)

(52) U.S. Cl.
CPC .................................. *B62D 63/08* (2013.01)

(58) Field of Classification Search
CPC ...................................................... B62D 63/08
USPC ......... 296/184.1, 193.07, 204; 280/793, 781, 280/784, 794
See application file for complete search history.

(56) References Cited

U.S. PATENT DOCUMENTS

| 1,941,323 | A | * | 12/1933 | Robinson | B62D 63/08 |
| | | | | | 280/423.1 |
| 2,337,281 | A | * | 12/1943 | Sherman | B60G 11/10 |
| | | | | | 188/268 |
| 2,820,645 | A | * | 1/1958 | Schilberg | B62D 21/06 |
| | | | | | 280/794 |
| 2,894,773 | A | * | 7/1959 | Noe | D02H 1/00 |
| | | | | | 403/385 |
| 3,116,074 | A | | 12/1963 | Koontz | |
| 3,394,949 | A | | 7/1968 | Gearhart | |
| 4,475,843 | A | * | 10/1984 | Wyler | E04C 5/166 |
| | | | | | 256/55 |
| 5,259,661 | A | * | 11/1993 | Thum | B62D 21/08 |
| | | | | | 296/203.01 |
| 5,417,454 | A | * | 5/1995 | Adams | B62D 21/00 |
| | | | | | 280/793 |
| 6,347,904 | B1 | * | 2/2002 | Knighton | E04C 5/166 |
| | | | | | 248/65 |
| 6,579,034 | B1 | * | 6/2003 | Welch | E01F 15/148 |
| | | | | | 256/13.1 |

(Continued)

FOREIGN PATENT DOCUMENTS

| DE | 10059261 A1 | 7/2001 |
| DE | 10040673 A1 | 2/2002 |

(Continued)

OTHER PUBLICATIONS

International Search Report and Written Opinion issued in PCT/US2016/044341, dated Apr. 20, 2017, 13 pages.

*Primary Examiner* — Joseph D. Pape

(74) *Attorney, Agent, or Firm* — Lewis Roca Rothgerber Christie LLP

(57) ABSTRACT

A stabilizing structure for increasing structural stability of a trailer is provided. The stabilizing structure includes one or more stabilizing units having tension cables and coupling mounts connecting the tension cables to a bottom frame of the trailer. The tension cables are arranged such that a first tension cable overlaps a second tension cable. The tension cables may have threaded ends that are connected to the coupling mounts. A support plate may be provided wherein the support plate is positioned at an intersection of the two tension cables such that a first tension cable is below the support plate and a second tension cable is above the support plate. A single support plate may connect tension cables of adjacent stabilizing units.

21 Claims, 8 Drawing Sheets

(56) References Cited

U.S. PATENT DOCUMENTS

| | | | |
|---|---|---|---|
| 7,229,098 B2* | 6/2007 | Mangalaramanan | B62D 21/02 267/273 |
| 7,273,230 B2* | 9/2007 | Kiel | B62D 21/02 180/311 |
| 7,891,728 B2* | 2/2011 | Westing | B62D 21/06 280/793 |
| 2004/0108754 A1* | 6/2004 | Igarashi | B62D 25/087 296/204 |
| 2006/0151986 A1 | 7/2006 | Reid et al. | |
| 2006/0213144 A1 | 9/2006 | Kessler et al. | |

FOREIGN PATENT DOCUMENTS

| | | |
|---|---|---|
| DE | 20 2006 010 594 U1 | 12/2007 |
| DE | 10 2008 021 870 A1 | 11/2009 |
| EP | 1580096 A1 | 9/2005 |
| EP | 2 535 217 A2 | 12/2012 |
| FR | 2 789 044 | 8/2000 |

* cited by examiner

STABILIZING STRUCTURE FOR A TRAILER

FIELD

The present disclosure relates to a stabilizing structure for a trailer.

BACKGROUND

Trailers may be used to transport sizable quantities of goods at one time. These trailers may include pull-type trailers which may be pulled by big-rigs. Due to the size of the trailers and the bulk of transported goods, trailers may be prone to instabilities during transport. Instabilities may include body roll (or tipping), misalignment of the trailer relative to the pulling vehicle, and/or unstable walls.

Existing trailer designs may include added steel beams for rigidity. Such beams may be heavy, reducing available cargo weight, and may additionally suffer from fatigue during repeated use of the trailer. For example, due to the relative lack of flexibility of the beams, stress may become concentrated at certain points when the beams are subjected to forces (e.g., compressive forces). These forces can lead to failure of the beam after a period of time.

SUMMARY

Embodiments of the invention provide a stabilizing structure for a trailer that increases the dynamic structural stability of the trailer, for example during transport. In particular, the stabilizing structure utilizes tension cables to prevent or reduce body roll of the trailer, to keep walls of the trailer stable, to align sides of the trailer to keep them straight, and/or to prevent or reduce misalignment of the trailer relative to a pulling vehicle.

Further, embodiments of the invention provide a stabilizing structure that has high strength (e.g., a high tensile strength), is light weight to reduce added weight to the trailer, and that minimizes fatigue over repeated use.

In one or more embodiments, a stabilizing structure for increasing stability of a trailer is provided that includes one or more tension cables configured to be coupled to a bottom frame of the trailer and configured to extend at least partially across a width of the trailer. The stabilizing structure includes one or more coupling mounts configured to be rigidly affixed to the trailer. Threaded ends of the tension cables are connected to the coupling mounts.

In one or more embodiments, a stabilizing structure for a trailer is provided with a first stabilizing unit having two tension cables arranged such that a first tension cable overlaps a second tension cable, and a second stabilizing unit having two tension cables arranged such that a third tension cable overlaps a fourth tension cable. A single coupling mount is connected to at least one tension cable of the first stabilizing unit and at least one tension cable of the second stabilizing unit.

In one or more embodiment embodiments, a stabilizing structure for a trailer is provided with two tension cables configured to be coupled to a bottom frame of the trailer, the two tension cables arranged such that a first tension cable overlaps a second tension cable, and a cable support. The cable support is positioned at an intersection of the two tension cables such that a first tension cable is below the cable support and a second tension cable is above the cable support.

In one or more embodiments, a trailer is provided having a bottom frame on an underside of the trailer. The trailer has a stabilizing structure with one or more tension cables coupled to the bottom frame of the trailer. The one or more tension cables extend at least partially across a width of the trailer and have threaded ends. The stabilizing structure includes one or more coupling mounts rigidly affixed to the trailer. The threaded ends of the tension cables are connected to the coupling mounts. In one or more embodiments, a lower edge of the frame is below a lower edge of at least one coupling mount. In one or more embodiments, a lower edge of at least one coupling mount is below a lower edge of the frame.

DETAILED DESCRIPTION

Figure 1:
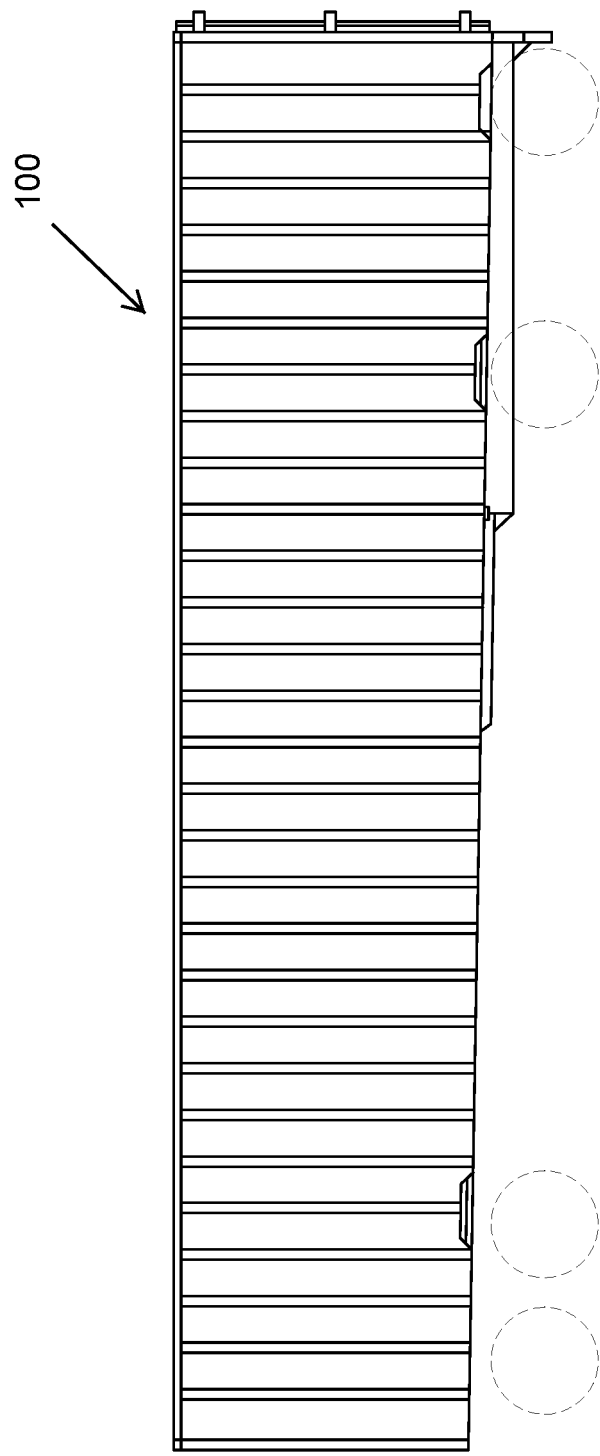
FIG. 1 illustrates a side view of a trailer according to one or more embodiments of the invention.

FIG. 1 depicts a side view of a trailer 100 according to one or more embodiments of the invention. The trailer 100 may be used to transport sizable quantities of goods at one time, such as freight. The trailer 100 may be a pull-type trailer that is pulled by a powered truck, also known as a big-rig or tractor. The trailer 100 may attach to a powered truck or to another trailer (e.g., as part of a chain of trailers). The trailer 100 may additionally or alternatively be part of a single construction with a motorized vehicle, such as a cargo van. The trailer 100 may have an open design for carrying loads, such as a flat-bed trailer, and/or may have an enclosed design. As shown in FIG. 1, the trailer 100 has a substantially rectangular shape, but it should be appreciated that the invention is not limited thereto or thereby.

Figure 2:
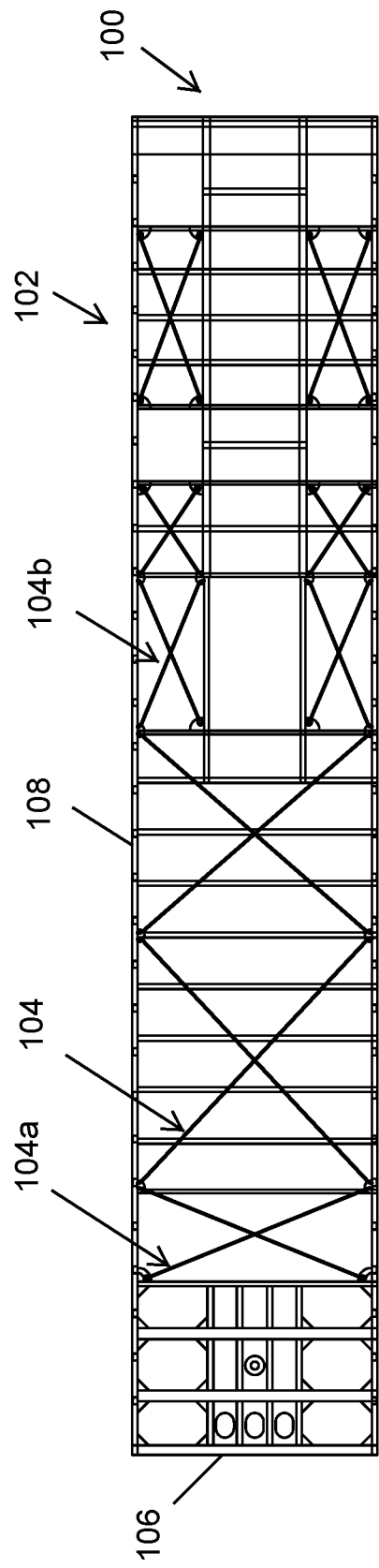
FIG. 2 illustrates a bottom view of a trailer according to one or more embodiments of the invention.

FIG. 2 depicts a bottom view of the trailer 100 of FIG. 1. As shown in FIG. 2, the underside of the trailer 100 has a stabilizing structure 102 which includes one or more stabilizing units 104. The stabilizing structure 102 may include stabilizing units 104*a* that extend across an entire width 106 of the trailer 100 (i.e., between left and right sides of the trailer 100). The stabilizing structure 102 may additionally or alternatively include stabilizing units 104*b* that extend across a partial width of the trailer 100. As shown, each of the stabilizing units 104 also extends across a partial length 108 of the trailer 100 (i.e., between a front and back of the trailer 100). The number of stabilizing units 104 in the stabilizing structure 102 may vary for different trailers 100.

Figure 3:
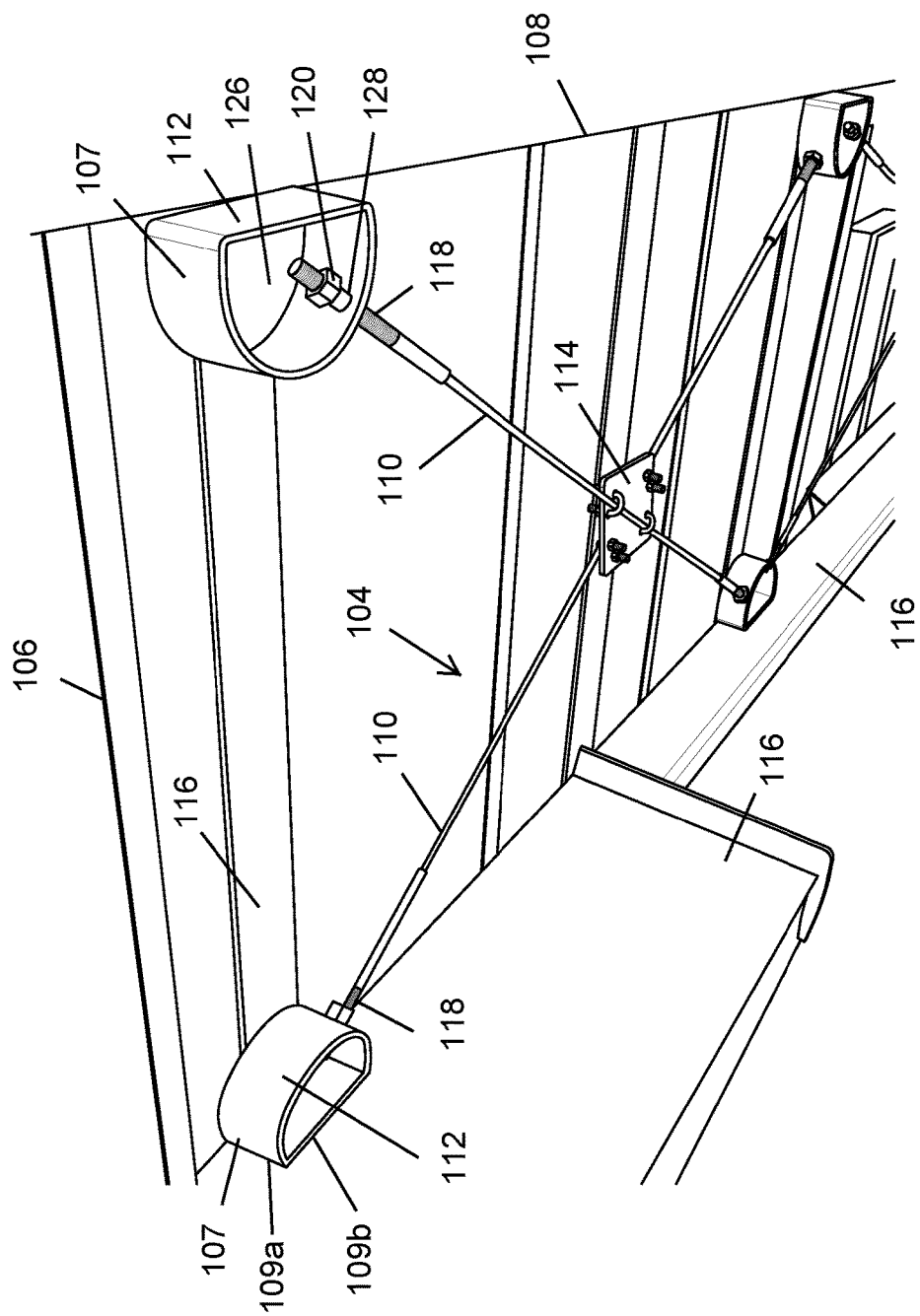
FIG. 3 illustrates a perspective view from below a stabilizing unit according to one or more embodiments of the invention.

FIG. 3 depicts a view from below a stabilizing unit 104 according to one or more embodiments. In general, the stabilizing units 104 provide structural stability to the trailer 100. The stabilizing units 104 help to prevent or reduce body roll of the trailer 100 (or tipping), help to keep the walls of the trailer 100 stable, and/or help to prevent or reduce misalignment of the trailer 100 relative to a pulling vehicle (also known as dog tracking). In addition, the stabilizing units 104 are used to align sides of the trailer 100 to keep them straight.

With reference also to FIG. 3, the stabilizing unit 104 includes tension cables 110, coupling mounts 112, and a cable support or support plate 114. As described in more detail below, the coupling mounts 112 connect the tension cables 110 to an underside of the trailer 100 (e.g., to a frame 116 of the trailer 100). The stabilizing unit 104 may have a high strength (e.g., a high tensile strength). The stabilizing unit 104 may have a light weight to reduce the dead load weight of the trailer 100 and increase the maximum payload of the trailer 100.

When the trailer 100 receives tensile forces, such as when the trailer 100 turns around a corner, the tensile forces may be transmitted to the tension cables 110 by the frame 116 of the trailer 100. The tension cables 110 resist the tensile forces by providing reactionary compressive forces to the coupling mounts 112 and to the frame 116 thereby adding structural stability to the trailer 100 and preventing or reducing potential instabilities of the trailer 100 described above. In addition, the tension cables 110 may be installed with a preload or initial set tension, which may be adjustable after installation. Moreover, when the trailer 100 receives compressive forces, the compressive forces may be transmitted to the tension cables 110 by the frame 116. Under compression, the tension in the tension cables 110 may be reduced and the tension cables 110 may go slack to reduce or prevent fatigue of the tension cables 110. In one or more embodiments, one or more tension cables 110 may receive tensile forces while other tension cables 110 receive compressive forces.

As will be understood, although the tension cables 110 may be made from a relatively rigid material such that they can support the frame 116 in tension, the tension cables 110 are dimensioned such that they can bend under compression without being subjected to forces large enough to damage or distort the tension cables 110, even after long periods of time. In one or more embodiments, the tension cables 110 may have a diameter of 0.25" to 0.375". The tension cables 110 may be made of metal, for example, steel, stainless steel, or any other suitable materials. The tension cables 110 may be made of materials which provide corrosion resistance against exposure to air, moisture, and other substances. While two tension cables 110 are shown in the stabilizing unit 104 of FIG. 3, it should be appreciated that the stabilizing unit 104 may include fewer or more tension cables 110 in a variety of configurations. For example, the configuration of the tension cables 110 as shown in FIG. 2 may be used.

The coupling mounts 112 connect the tension cables 110 to the underside of the trailer 100. The coupling mounts 112 are rigidly affixed to the trailer 100 and may be permanently affixed to the trailer 100. In one or more embodiments, the coupling mounts 112 may be affixed to portions of the frame 116 of the trailer 100. In particular, the coupling mounts 112 may be affixed to portions of the frame 116 that extend across the width 106 of the trailer 100 and/or portions of the frame 116 that extend across the length 108 of the trailer 100. The coupling mounts 112 may have portions extending below a lower edge 115 of the frame 116 (see, e.g., FIG. 7) and/or may have portions that are recessed relative to a lower edge 115 of the frame 116 (e.g., a portion of the frame 116 may be below a lower edge of the coupling mounts 112). The coupling mounts 112 may be affixed to the trailer 100 by welding, fasteners, adhesive, and/or any other suitable means for forming a rigid connection. The coupling mounts 112 may be made of metal, for example, steel, stainless steel, or any other suitable materials. The coupling mounts 112 may be made of the same material as the tension cables 110 or may be made of different materials.

In one or more embodiments, the coupling mounts 112 are defined by a sidewall 107 of the coupling mounts 112 extending from a portion of the frame 116. The sidewall 107 may form a roughly circular shape defining a hollow central area 126. The sidewall 107 may have a height 109a that is less than a width 109b of the sidewall 107. The coupling mounts 112 may have a curved profile 130 with a first portion 132 and a second portion 134 that, for example, form arcs (see FIG. 6). The first portion 132 of the curved profile 130 may be between the second portion 134 and a longitudinal center of the frame of the trailer. The first portion 132 may face the longitudinal center of the frame of the trailer. The sidewall 107 may also include openings 128 each configured to accommodate an end portion 118 (e.g., an end) of a respective tension cable 110. As will be appreciated, each coupling mount 112 may include a number of openings 128 equal to the number of tension cable ends 118 configured to be accommodated therein. Further, the coupling mounts 112 may be dimensioned such that the cable ends 118 of multiple tension cables 110 can extend into the central hollow space 126 without interfering with each other.

The ends 118 of the tension cables 110 may be threaded for connection to the coupling mounts 112. In one or more embodiments, the ends 118 of the tension cables 110 may include connectors, such as Swagelok® compression fittings. The threaded ends 118 of the tension cables 110 may be connected to the coupling mounts 112 via one or more fittings 120 (e.g., nuts). Also, due to the threaded ends 118, the amount of tension in the tension cables 110 can be adjusted by loosening or tightening the fittings 120 attached to the threaded end 118. As shown in FIG. 3, each of the tension cables 110 is connected to two coupling mounts 112.

In one or more embodiments, the stabilizing unit 104 includes at least two tension cables 110 that each extend diagonally across a section of the underside of the trailer 100 (i.e., the tension cables 110 extend across at least a portion of the width 106 and at least a portion of the length 108 of the trailer 100). As described more fully below, the tension cables 110 overlap each other with a support plate or cable support 114 between the overlapping tension cables 110. In one or more embodiments, the rounded nature of the sidewalls 107 allows the ends 118 of the tension cables 110 to be oriented substantially perpendicular to the respective sidewall 107 when the tension cables 110 extends diagonally across the frame 116. Thereby, bending stresses of the tension cables 110 can be minimized and, when the tension cables 110 are in tension, maximize support provided by the sidewalls 107 of the coupling mounts 112.

Figure 4:
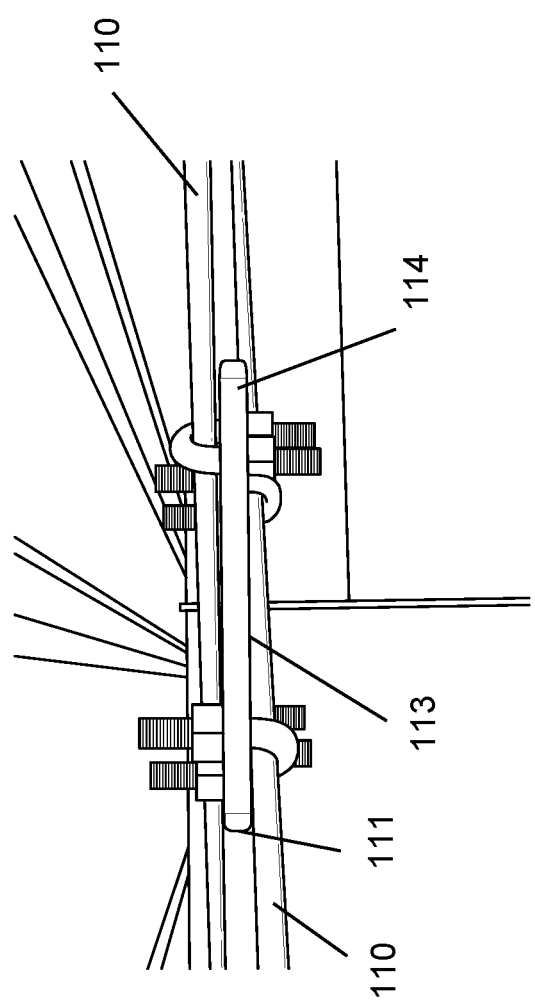
FIG. 4 illustrates an enlarged perspective view of a detail of FIG. 3.
Figure 5:
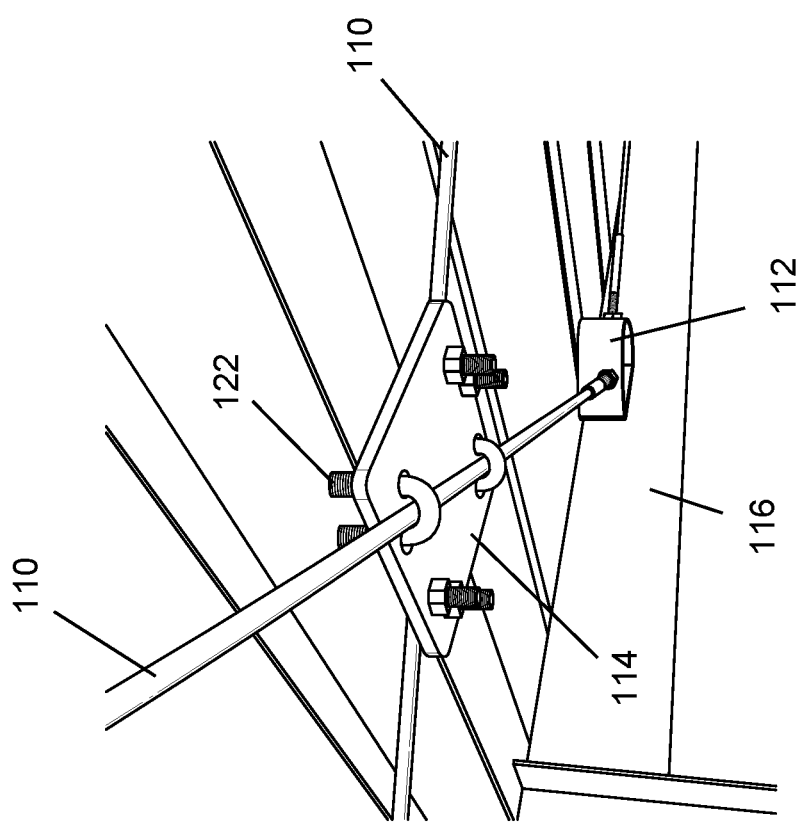
FIG. 5 illustrates an enlarged perspective view of the detail of FIG. 4.

FIGS. 4 to 5 depict detailed views of the support plate 114 of FIG. 3. The support plate 114 is provided at the intersection of the tension cables 110 of the stabilizing unit 104. The support plate 114 prevents frictional contact (e.g., rubbing or sliding) between the intersecting tension cables 110 which might otherwise cause wear and breakage of the tension cables 110. The support plate 114 additionally provides positional stability to the cables. The support plate may be mounted to the tension cables 110 by connectors 122 which accommodate the tension cables 110 therein. As shown in FIG. 3, the support plate 114 is configured to accommodate a first cable 110 on a first side thereof and a second cable 110 on a second opposite side thereof, and the connectors 122 may be oriented accordingly.

In one or more embodiments, the connectors 122 may include bolts having a U-shape. As shown in the figures, the tension cables 110 are accommodated between a curved portion of the connectors 122 and the support plate 114. As will be appreciated, the ability of the tension cables 110 to move can be influenced by tightening the connectors 122 to provide for less relative movement or loosening the connectors to provide for more relative movement. The support plate 114 may be made of metal, for example, steel, stainless steel, or any other suitable materials. The support plate 114 may be made of the same material as the tension cables 110 and/or coupling mounts 112 or may be made of different materials. The support plate 114 may have an elongate shape with a height 111 that is less than a width 113 of the support plate 114. The support plate 114 may be substantially rectangular and may have rounded or beveled corners.

Figure 6:
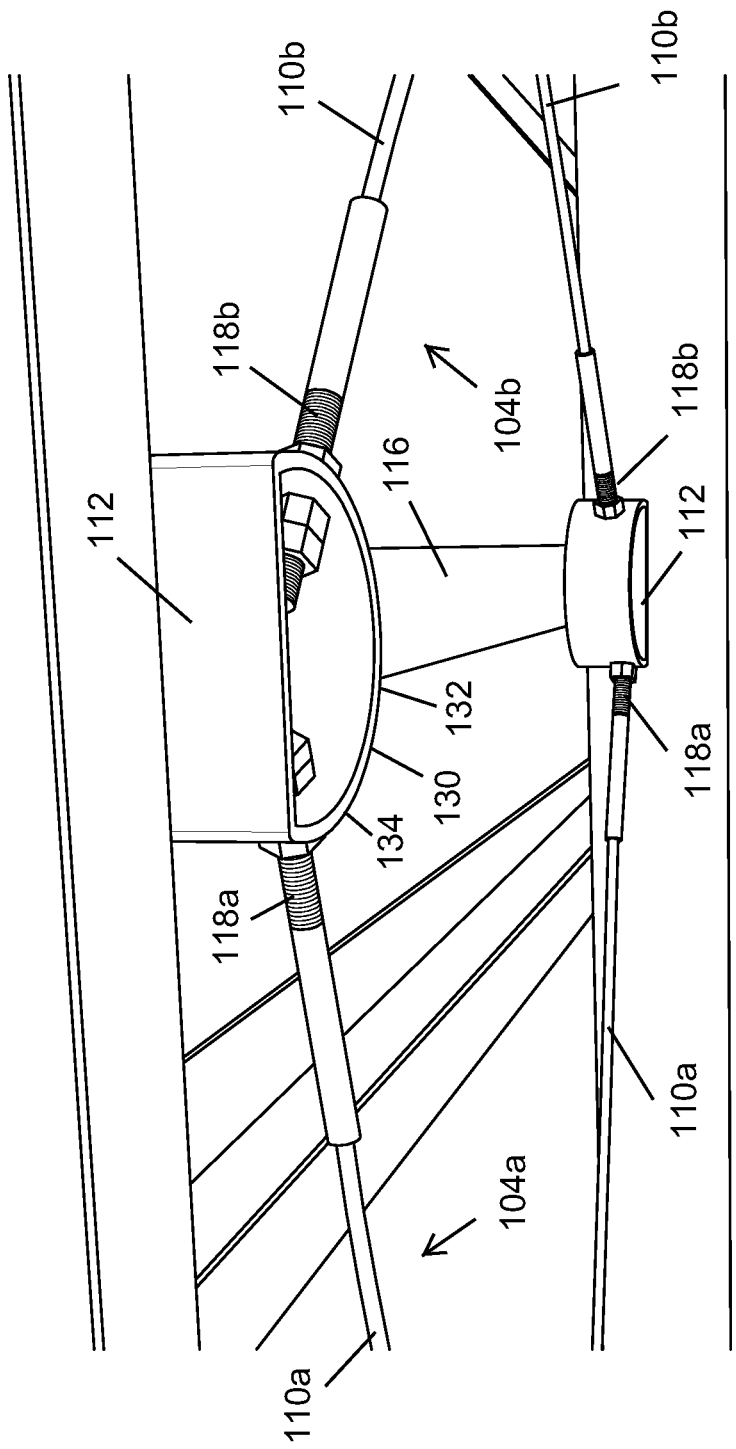
FIG. 6 illustrates an enlarged view of coupling mounts according to one or more embodiments of the invention.

FIG. 6 depicts coupling mounts 112 according to one or more embodiments. Two coupling mounts 112 are depicted in FIG. 6. The coupling mounts 112 of FIG. 6 are positioned over a portion of the frame 116 extending along the width 106 of the trailer 100. The couplings mounts 112 of FIG. 6 connect tension cables 110*a*, 110*b* of adjacent support units 104*a*, 104*b*. As shown in FIG. 6, each of the two coupling mounts 112 are connected to the ends 118*a*, 118*b* of respective tension cables 110*a*, 110*b*. As further shown in FIG. 6, the ends 118*a*, 118*b* of respective tension cables 110*a*, 110*b* may be each connected to the curved profile 130 of the coupling mount 112 and the ends 118*a*, 118*b* may be horizontally and vertically spaced from each other. By connecting to adjacent tension cables 110*a*, 110*b*, the coupling mounts 112 offset the forces acting on the coupling mounts 112 from each of the tension cables 110*a*, 110*b*.

Figure 7:
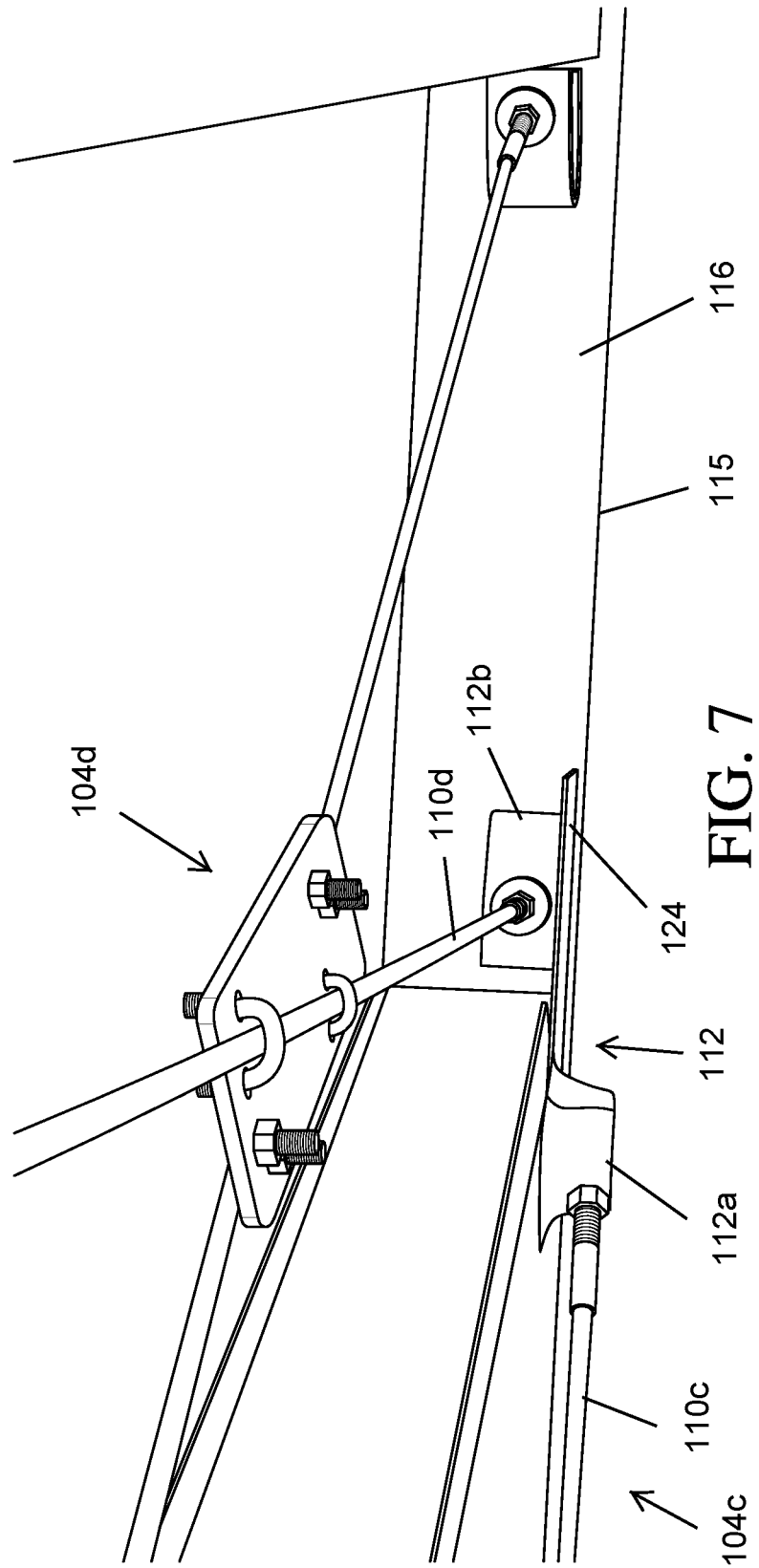
FIG. 7 illustrates an enlarged view of a coupling mount according to one or more embodiments of the invention.
Figure 8:
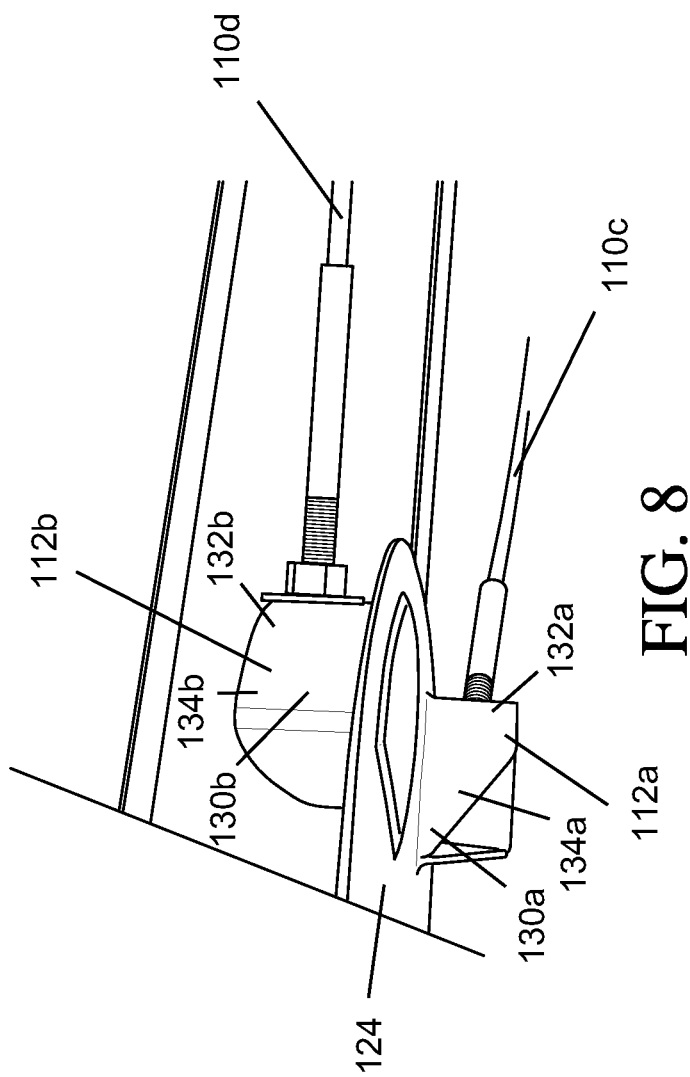
FIG. 8 illustrates a perspective view of the coupling mount of FIG. 8.

FIGS. 7 to 8 depict a coupling mount 112 according to one or more embodiments. The coupling mount 112 of FIGS. 7 and 8 include portions 112*a* (e.g., a first coupling mount portion) that extend below the lower edge 115 of the frame 116 and portions 112*b* (e.g., a second coupling mount portion) that are recessed relative to the lower edge 115 of the frame 116 (i.e., the lower edge 115 of the frame 116 is below a lower edge of the portion 112*b* of the coupling mount 112). Each of the coupling mount portions 112*a*, 112*b* may have a curved profile 130*a*, 130*b* with a first portion 132*a*, 132*b* and a second portion 134*a*, 134*b*. The first portion 132*a*, 132*b* of the respective curved profiles 130*a*, 130*b* may be between the second portion 134*a*, 134*b* of the curved profiles and a longitudinal center of the frame of the trailer. The portions 112*a*, 112*b* of the coupling mount 112 of FIGS. 7 and 8 are connected by a plate 124. The coupling mounts 112 may be rigidly affixed to the trailer 100 (e.g., the frame 116 of the trailer 100) via attachment by one or more of the portions 112*a*, 112*b* and/or the plate 124. The portions 112*a*, 112*b* (e.g., curved profiles 130*a*, 130*b*) are connected to different tension cables 110*c*, 110*d* and form parts of different stabilizing units 104*c*, 104*d*. The ends of the tension cables 110*c*, 110*d* may be threaded and may be horizontally and vertically spaced from each other. It should be appreciated that the coupling mounts 112 may include portions 112*a* that extend below the lower edge 115 of the frame 116 and may additionally or alternatively include portions 112*b* that are recessed relative to the lower edge 115 of the frame 116. The coupling mounts 112 may include recessed portions 112*b* relative to the lower edge 115 of the frame 116 to provide additional clearance under the trailer 100, for example for wheels of the trailer 100.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A stabilizing structure for a trailer comprising:
   a first tension cable and a second tension cable, each tension cable configured to be coupled to a bottom frame of the trailer and configured to extend at least partially across a width of the trailer, each of the tension cables having a threaded end; and
   a coupling mount having a curved profile and configured to be rigidly affixed to the trailer such that a first portion of the curved profile of the coupling mount is between a second portion of the curved profile and a longitudinal center of the frame of the trailer;
   wherein the threaded end of the first tension cable and the threaded end of the second tension cable are each connected to the curved profile of the coupling mount and are horizontally and vertically spaced from each other.

2. The stabilizing structure of claim 1, wherein the first and second tension cables are arranged such that the first tension cable overlaps the second tension cable.

3. The stabilizing structure of claim 2, further comprising four coupling mounts, wherein two coupling mounts connect to the first tension cable and two coupling mounts connect to the second tension cable.

4. The stabilizing structure of claim 1, further comprising a first stabilizing unit having the first and second tension cables, wherein the first and second tension cables are arranged such that the first tension cable overlaps the second tension cable, and a second stabilizing unit having two tension cables arranged such that a third tension cable overlaps a fourth tension cable.

5. The stabilizing structure of claim 4, wherein a single coupling mount is connected to the first tension cable of the first stabilizing unit and to the third tension cable of the second stabilizing unit.

6. The stabilizing structure of claim 1, wherein the coupling mount has a substantially hollow cross-section.

7. The stabilizing structure of claim 1, wherein the curved profile of the coupling mount has a sidewall having an arc shape.

8. The stabilizing structure of claim 1, wherein the first and second tension cables are made of a metal material.

9. The stabilizing structure of claim 1, wherein a lower edge of the coupling mount is configured to be arranged above a lower edge of the frame of the trailer.

10. The stabilizing structure of claim 1, wherein the first tension cable is configured to extend at least partially across a length of the trailer between a front end and a rear end of the trailer.

11. The stabilizing structure of claim 2, further comprising a cable support positioned between the overlapping first and second tension cables.

12. The stabilizing structure of claim 11, wherein at least one of the first and second tension cables is connected to the cable support by at least one U-shaped bolt.

13. The stabilizing structure of claim 7, wherein the threaded end of the first tension cable is received in an opening in the sidewall of the coupling mount.

14. A stabilizing structure for a trailer comprising:
   a first tension cable and a second tension cable, each tension cable configured to be coupled to a bottom frame of the trailer and arranged such that the first tension cable overlaps the second tension cable; and a cable support;
wherein the cable support is positioned at an intersection of the first and second tension cables such that the first tension cable is above the cable support and the second tension cable is below the cable support, and
wherein the cable support is connected to each of the first and second tension cables such that at least one of the first and second tension cables is movable relative to the other of the first and second tension cables.

15. The stabilizing structure of claim 14, wherein the cable support is connected to the first and second tension cables by connectors having a U-shape.

16. The stabilizing structure of claim 15, wherein the first and second tension cables are received in a curved portion of the respective U-shaped connectors.

17. A trailer comprising:
a bottom frame on an underside of the trailer; and
a stabilizing structure comprising:
  a first tension cable and a second tension cable, each tension cable coupled to the bottom frame of the trailer and extending at least partially across a width of the trailer, each of the tension cables having a threaded end;
  a first coupling mount portion having a curved profile, wherein a first portion of the curved profile of the first coupling mount portion is between a second portion of the curved profile of the first coupling mount portion and a longitudinal center of the frame of the trailer; and
  a second coupling mount portion having a curved profile, wherein a first portion of the curved profile of the second coupling mount portion is between a second portion of the curved profile of the second coupling mount portion and a longitudinal center of the frame of the trailer;
wherein the threaded end of the first tension cable is connected to the curved profile of the first coupling mount portion,
wherein the threaded end of the second tension cable is connected to the curved profile of the second coupling mount portion, and
wherein the threaded end of the first tension cable and the threaded end of the second tension cable are horizontally and vertically spaced from each other.

18. The trailer of claim 17, wherein a lower edge of the frame is below a lower edge of the second coupling mount portion.

19. The trailer of claim 18, wherein a lower edge of the first coupling mount portion is below a lower edge of the frame.

20. The stabilizing structure of claim 1, wherein when the coupling mount is rigidly affixed to the trailer, the first portion of the curved profile of the coupling mount faces the longitudinal center of the frame of the trailer.

21. The stabilizing structure of claim 14, wherein each of the first and second tension cables are movable relative to each other.

* * * * *